US007722252B2

(12) United States Patent
Tang et al.

(10) Patent No.: US 7,722,252 B2
(45) Date of Patent: May 25, 2010

(54) APPARATUS AND METHOD OF USE OF A HIGH-VOLTAGE DIAGNOSTIC TOOL FOR X-RAY SYSTEMS

(75) Inventors: Liang Tang, Waukesha, WI (US); John Breunissen, Wauwatosa, WI (US); Eric Biehr, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 25 days.

(21) Appl. No.: 12/163,170

(22) Filed: Jun. 27, 2008

(65) Prior Publication Data

US 2009/0322339 A1 Dec. 31, 2009

(51) Int. Cl.
*G01D 18/00* (2006.01)

(52) U.S. Cl. .......................................... 378/207; 378/91

(58) Field of Classification Search ................... 378/91, 378/98, 101, 207, 210
See application file for complete search history.

*Primary Examiner*—Jurie Yun
(74) *Attorney, Agent, or Firm*—Ziolkowski Patent Solutions Group, SC

(57) ABSTRACT

A diagnostic tool for an x-ray imaging system includes a first test device configured to simulate a first load condition of an x-ray tube, and a first connector electrically coupled to the first test device and configured to couple the first test device to a high-voltage generator in the x-ray imaging system.

22 Claims, 7 Drawing Sheets

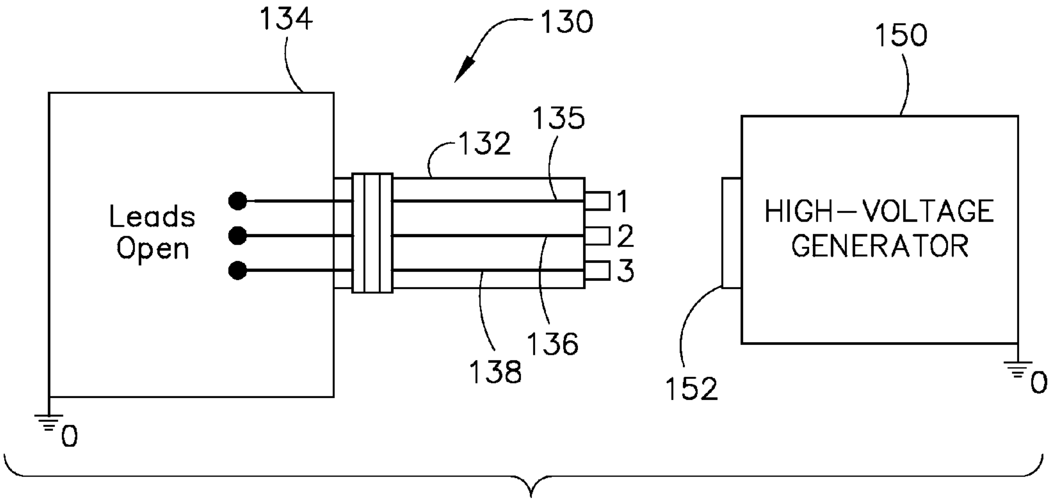
FIG. 5
FIG. 6
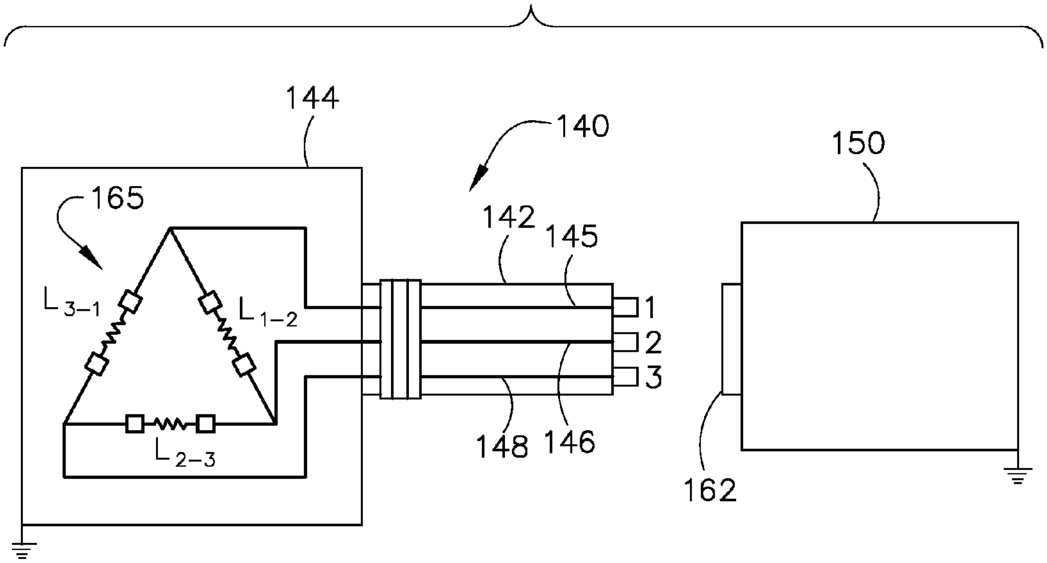

APPARATUS AND METHOD OF USE OF A HIGH-VOLTAGE DIAGNOSTIC TOOL FOR X-RAY SYSTEMS

BACKGROUND OF THE INVENTION

The invention relates generally to systems having a high-voltage energy source and, more particularly, to a method and apparatus of providing a high-voltage diagnostic tool for x-ray imaging systems.

Typically, in an x-ray imaging system such as a computed tomography (CT) imaging system, an x-ray source emits a fan-shaped beam toward a subject or object, such as a patient or a piece of luggage. Hereinafter, the terms “subject” and “object” shall include anything capable of being imaged. The beam, after being attenuated by the subject, impinges upon an array of radiation detectors. The intensity of the attenuated beam radiation received at the detector array is typically dependent upon the attenuation of the x-ray beam by the subject. Each detector element of the detector array produces a separate electrical signal indicative of the attenuated beam received by each detector element. The electrical signals are transmitted to a data processing system for analysis which ultimately produces an image.

The x-ray source, or x-ray tube, is connected to a high-voltage (HV) generator or tank via high-voltage cables or lines, wherein the HV generator provides the x-ray tube with voltage sufficient to emit an x-ray beam toward the subject. On occasion, x-ray tubes fail when in use in the imaging system due to high-voltage instability, thereby necessitating service to the imaging system by a trained technician. This high-voltage instability results in a high-voltage discharge or arcing between the electrodes of the x-ray tube or between an electrode and ground, where these high-voltage discharges are commonly referred to in the art as “spits.” The “spits” can cause not only failure of the x-ray tube itself, but also failure of attached electrical components.

Typically, the technician will perform a no-load test using a “dummy plug” in place of an x-ray tube. The dummy plug is designed to maintain the insulation integrity of the system, which is generally done by leaving the pins of the dummy plug open or shorted to provide adequate insulation for the system, yet not provide the load characteristics of an x-ray tube. The use of a dummy plug in this manner allows the technician to distinguish whether the system failure is attributable to a faulty x-ray tube or high-voltage instability in the HV generator and/or high-voltage cables. Based on the results of this test, the technician typically decides whether it is desired to either simply replace the x-ray tube or to perform a more in-depth analysis of the HV generator using, for instance, another x-ray tube.

However, while the no-load test using a dummy plug may distinguish whether the failure is attributable to the x-ray tube or the HV generator, the test typically does not allow the technician to diagnose or detect specific problems that may be related to the x-ray tube, HV generator, or high-voltage cables. For instance, kV regulation errors related to the HV generator would not be detectable when using the dummy plug, as the dummy plug does not mimic the load characteristics of an x-ray tube. As such, a technician typically cannot diagnose specific issues related to the HV generator while in the field. Thus, by using a dummy plug, solutions proposed by the technician in correcting the HV generator or x-ray tube issues may not address the actual failure mode of the system.

In order to diagnose a system problem, a technician may use a second known-good x-ray tube which may be connected to the generator to test the system. However, if the problem being diagnosed is in the high-voltage generator, then the technician may unknowingly put the second x-ray tube at risk. Thus, if the second x-ray tube is damaged in the process, it may cost additional time, money, and inconvenience to both the technician and the owner of the system before the problem can be properly diagnosed.

Therefore, it would be desirable to design an apparatus and method of providing a high-voltage diagnostic tool for x-ray imaging systems that is capable of providing load conditions for an HV generator during troubleshooting, and is further capable of allowing a technician to diagnose specific problems related to HV generator and/or tank/generator integration issues.

BRIEF DESCRIPTION OF THE INVENTION

The invention is a directed method and apparatus for simulating or mimicking load conditions of an x-ray tube for an HV generator during troubleshooting, and is further capable of allowing a technician to diagnose specific problems related to HV generator and/or generator/tube integrated functional issues.

According to one aspect of the present invention, a diagnostic tool for an x-ray imaging system includes a first test device configured to simulate a first load condition of an x-ray tube, and a first connector electrically coupled to the first test device and configured to couple the first test device to a high-voltage generator in the x-ray imaging system.

In accordance with another aspect of the invention, a method of manufacturing a diagnostic tool for an x-ray imaging system includes forming an x-ray tube mimicking device comprising one or more capacitors and resistors. The method further includes attaching a plug interface to the x-ray tube mimicking device, the plug interface configured to connect to a receptacle in the x-ray imaging system, and providing a plurality of leads connecting the plug interface to the one or more capacitors and resistors of the x-ray tube mimicking device.

Yet another aspect of the present invention includes a method of diagnosing high-voltage problems for an x-ray imaging system that includes connecting a testing device to a high-voltage generator, the testing device configured to mimic a load condition of an x-ray tube, applying power to the testing device, and identifying a source of a high-voltage instability in the x-ray imaging system using the connected device.

Various other features and advantages of the invention will be made apparent from the following detailed description and the drawings.

BRIEF DESCRIPTION OF THE DRAWINGS

The drawings illustrate one preferred embodiment presently contemplated for carrying out the invention.

In the drawings:

FIG. 5 is a schematic diagram of a testing device for testing major insulation on the anode side of a high-voltage generator, according to another embodiment of the invention.

FIG. 6 is a schematic diagram of a testing device for testing minor insulation on the anode side of a high-voltage generator, according to another embodiment of the invention.

DETAILED DESCRIPTION OF THE PREFERRED EMBODIMENT

Figure 1:
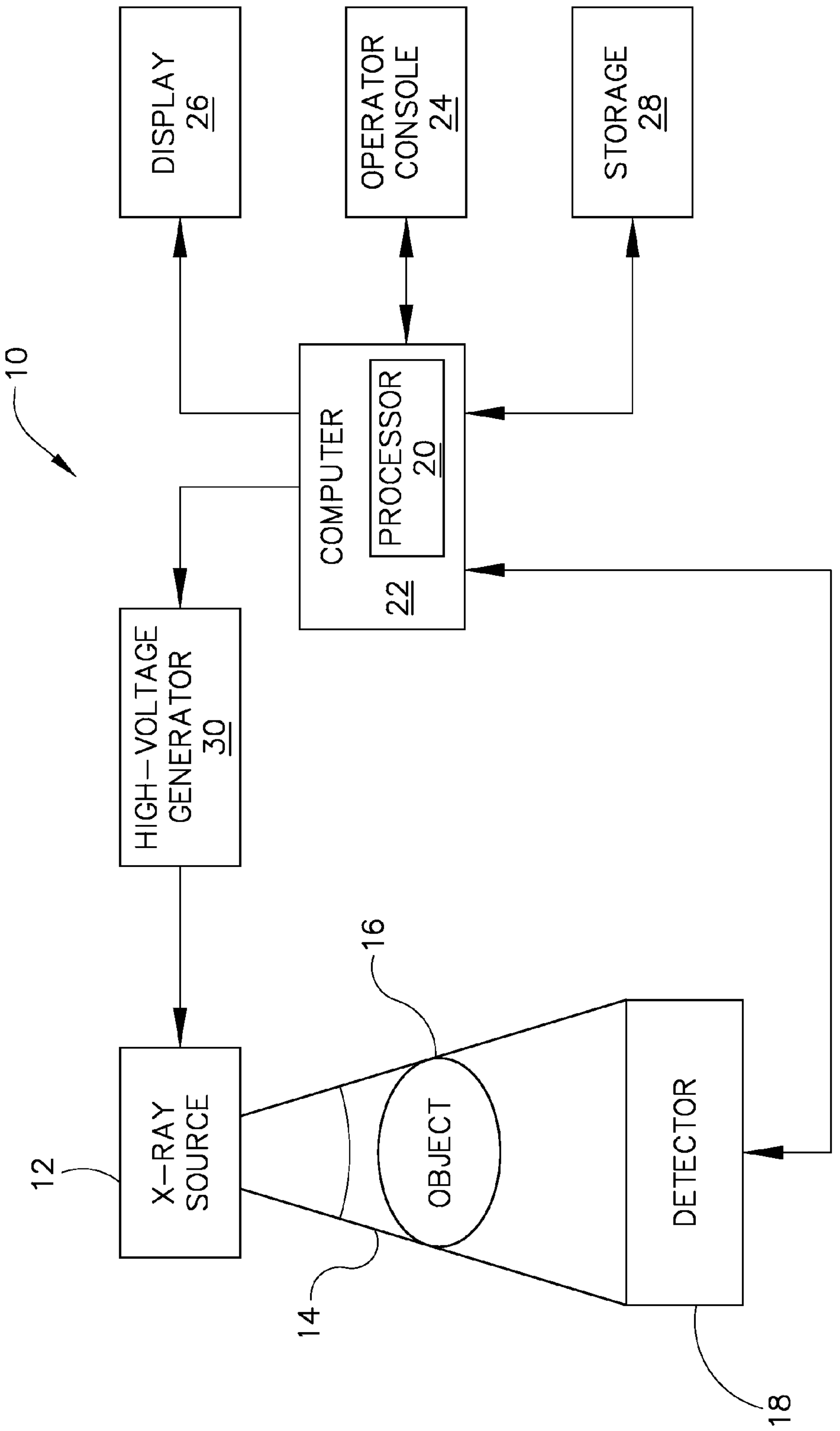
FIG. 1 is a block diagram of an imaging system that can benefit from incorporation of an embodiment of the invention.

FIG. 1 is a block diagram of an embodiment of an imaging system 10 designed to acquire original image data and to process the image data for display and/or analysis. It will be appreciated by those skilled in the art that embodiments of the invention are applicable to numerous medical imaging systems implementing an x-ray tube, such as x-ray or mammography systems. Other imaging systems or modalities such as computed tomography (CT) systems and digital radiography systems, which acquire image three dimensional data for a volume, also benefit from embodiments of the invention. The following discussion of x-ray system 10 is merely an example of one such implementation and is not intended to be limiting in terms of modality.

As shown in FIG. 1, x-ray system 10 includes an x-ray source 12 configured to project a beam of x-rays 14 through an object 16. Object 16 may include a human subject, pieces of baggage, or other objects desired to be scanned. X-ray source 12 may be a conventional x-ray tube producing x-rays having a spectrum of energies that range, typically, from 30 keV to 200 keV. The x-rays 14 pass through object 16 and, after being attenuated by the object, impinge upon a detector 18. Each detector in detector 18 produces an analog electrical signal that represents the intensity of an impinging x-ray beam, and hence the attenuated beam, as it passes through the object 16. In one embodiment, detector 18 is a scintillation based detector; however, it is also envisioned that direct-conversion type detectors (e.g., CZT detectors, etc.) may also be implemented.

Referring still to FIG. 1, a processor 20 receives the analog electrical signals from the detector 18 and generates an image corresponding to the object 16 being scanned. A computer 22 communicates with processor 20 to enable an operator, using operator console 24, to control the scanning parameters and to view the generated image. That is, operator console 24 includes some form of operator interface, such as a keyboard, mouse, voice activated controller, or any other suitable input apparatus that allows an operator to control the x-ray system 10 and view the reconstructed image or other data from computer 22 on a display unit 26. Additionally, console 24 allows an operator to store the generated image in a storage device 28 which may include hard drives, floppy discs, compact discs, etc. The operator may also use console 24 to provide commands and instructions to computer 22 for controlling a high-voltage generator 30 that provides power and timing signals to x-ray source 12.

Typically, x-ray source 12 is an x-ray tube connected to a high-voltage generator, such as the high-voltage generator 30 illustrated in FIG. 1, which supplies the high-voltage for operating the x-ray tube. In one arrangement, the x-ray tube includes one or more filaments positioned within a cathode that emit electrons toward an anode when the high-voltage is applied thereto, and when a current is driven through the one or more filaments. In another arrangement, the x-ray tube includes, typically, a single filament having bias tabs positioned proximately thereto. In such an arrangement, bias voltages may be applied to the bias tabs in a rapidly alternating fashion in order to redirect the electron beam emitted from the filament, in order to "wobble" the beam as it is directed toward the anode. As is known in the art, such arrangements typically may include a lead for controlling length of the focal spot, a focus electrode, right and left deflection bias tabs, and a common. In an alternate known arrangement, the beam may be "wobbled" via electromagnetic deflection.

As mentioned above, x-ray tubes may experience a failure when in use in an imaging system due to high-voltage instability. Previously, the source of such high-voltage instability was not easily determined by technicians working in the field. However, embodiments of the invention provide a diagnostic tool connectable to the high-voltage generator that is capable of mimicking operation of an x-ray tube and enabling a technician to determine the source of high-voltage instability, thereby allowing technicians to effectively and efficiently resolve issues pertaining to the x-ray tube, the high-voltage generator, or the high-voltage cable connected therebetween.

High-voltage systems like those discussed above may either be monopolar systems or bipolar systems. In monopolar systems, the high-voltage generator comprises a single high-voltage receptacle to which an x-ray tube or other device is connected. The single receptacle is designed to provide a negative high-voltage to the cathode side of, for example, an x-ray tube, while the anode side of the x-ray tube is grounded. Conversely, a bipolar system comprises two high-voltage receptacles, one of which provides negative high-voltage to, for example, the cathode side of the x-ray tube and another that provides positive high-voltage to, for example, the anode side of the x-ray tube.

Figure 2:
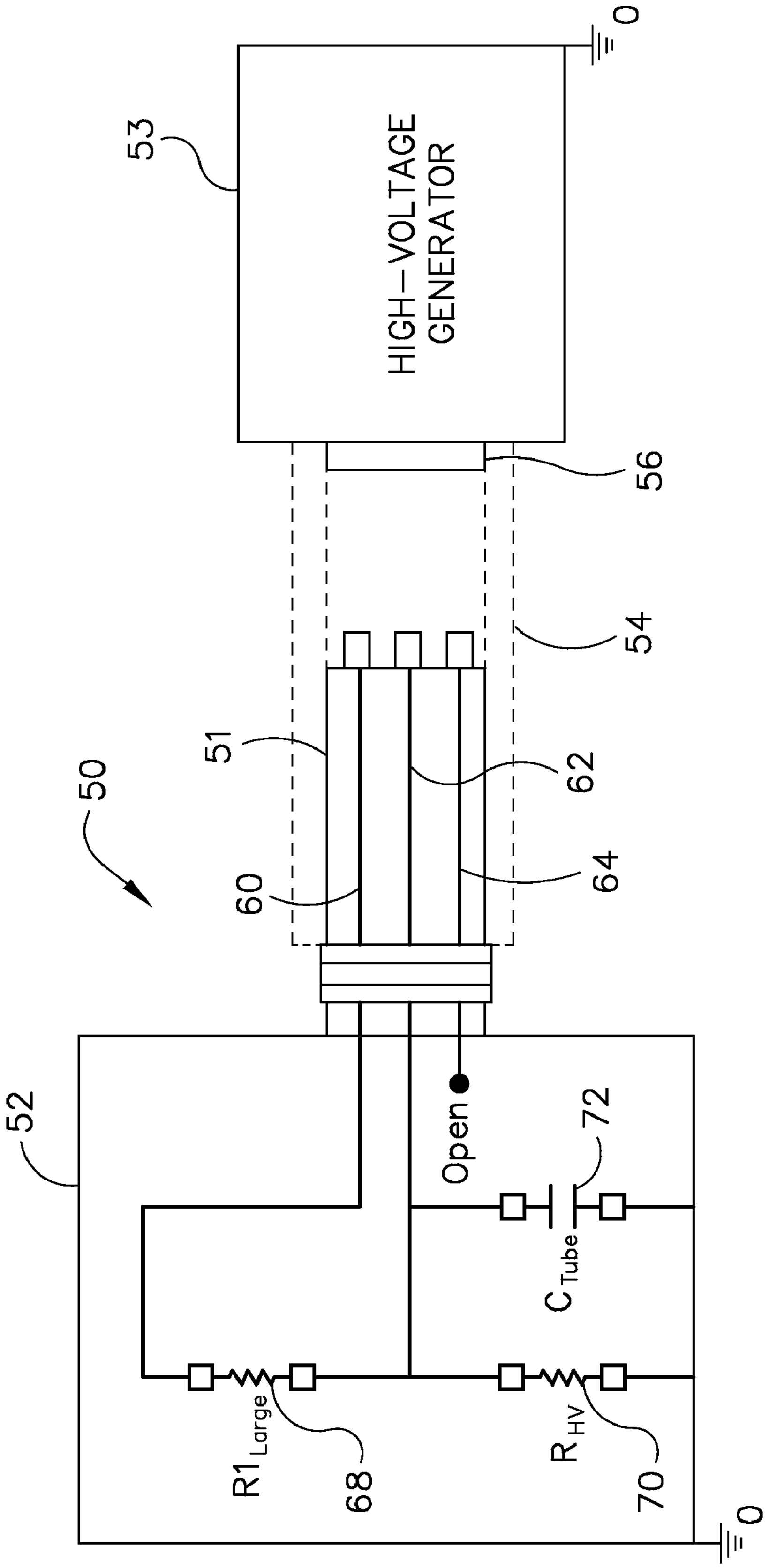
FIG. 2 is a schematic diagram of a testing device for testing major or minor insulation on the cathode side of a high-voltage generator, according to an embodiment of the invention.
Figure 3:
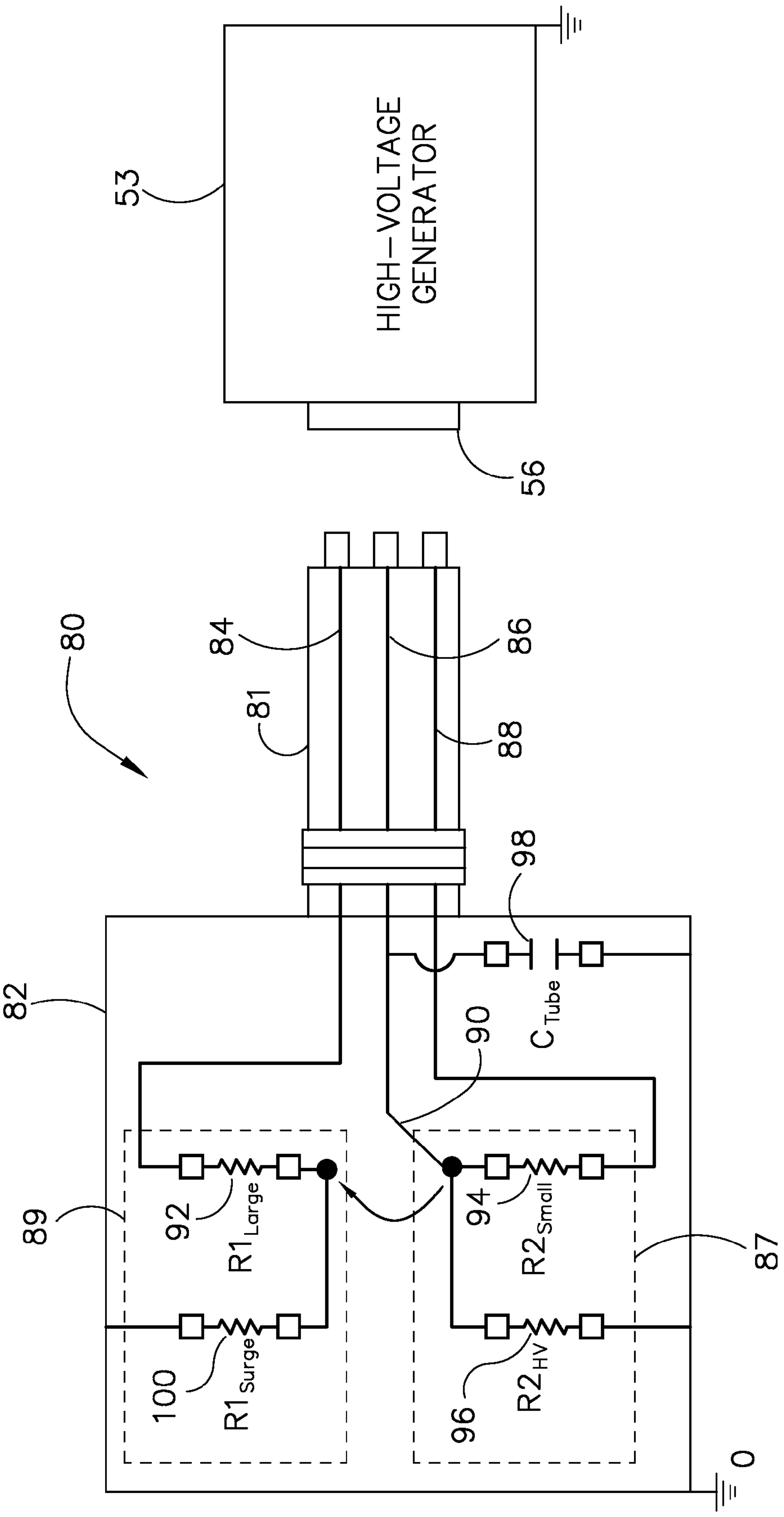
FIG. 3 is a schematic diagram of a testing device for testing major or minor insulation on the cathode side of a high-voltage generator, according to another embodiment of the invention.
Figure 4:
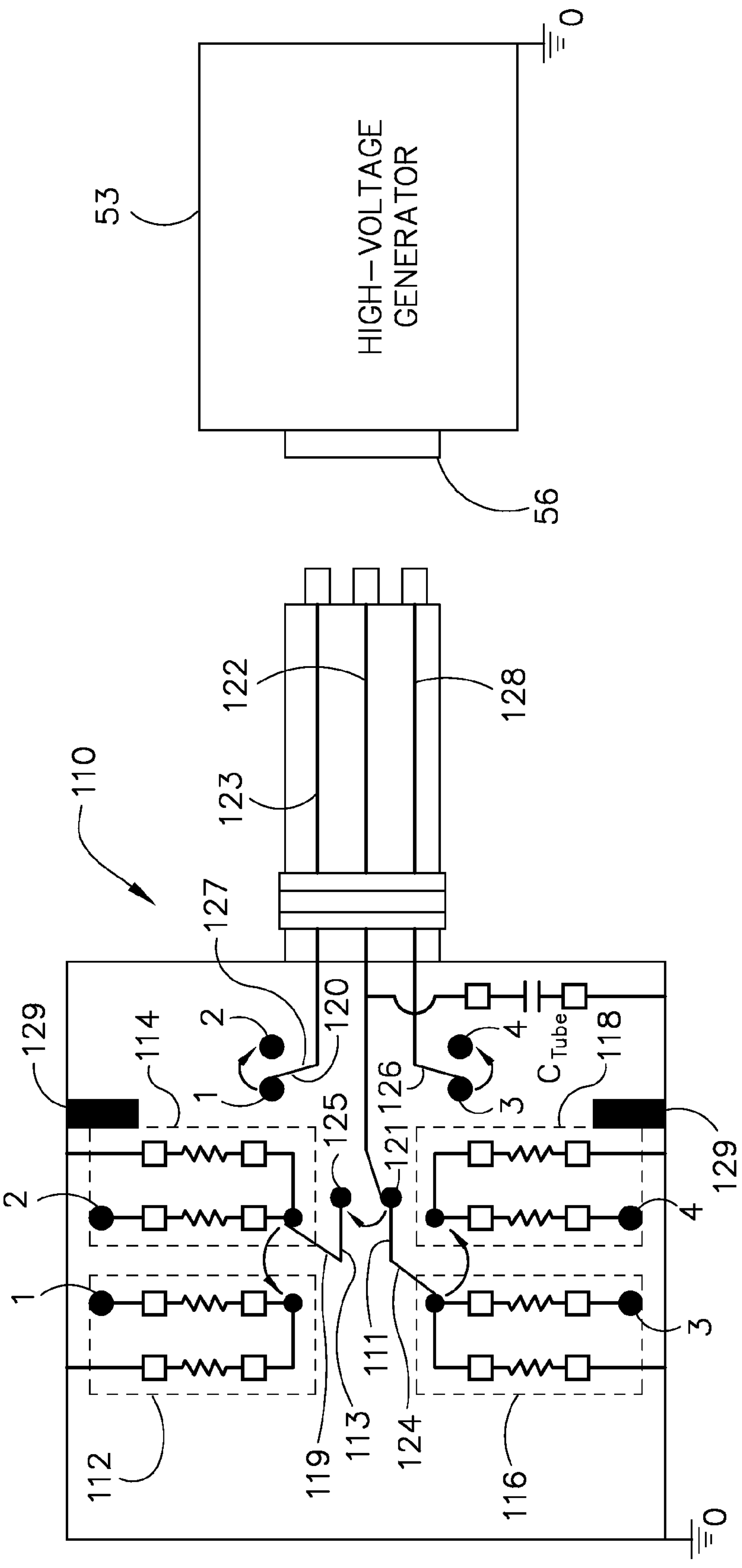
FIG. 4 is a schematic diagram of a testing device for testing major or minor insulation on the cathode side of a high-voltage generator, according to another embodiment of the invention.

As will be set forth below, embodiments of the invention provide for the testing of devices for both monopolar systems and bipolar systems. FIGS. 2-4, which will be discussed in further detail below, show devices according to embodiments of the invention that are capable of being used alone in a monopolar system to test for high-voltage instability on the cathode side of a system. FIGS. 5-6, on the other hand, include devices according to embodiments of the invention used in bipolar systems. The embodiments shown in FIGS. 5-6 are input into the anode side of the high-voltage generator and are designed to be used in conjunction with a device similar to that shown in any of FIGS. 2-4, which would be input into the cathode side of the high-voltage generator.

The testing devices of FIGS. 2-6 are designed to test major and/or minor insulation in an x-ray system. Major insulation is known as high-voltage insulation, e.g., from 140 kV to ground. Minor insulation, on the other hand, is insulation typically between lines carrying voltages ranging from 20 V to 2 kV. The cathode-side testing devices shown with regard to FIGS. 2-4 are capable of testing both major and minor insulation on the cathode side of either a monopolar or a bipolar device, while the testing devices shown in FIGS. 5-6 are designed to test, respectively, major insulation or minor insulation on the anode side of a bipolar device. The specific details of the testing devices according to embodiments of the invention are set forth herebelow.

Referring now to FIG. 2, testing device or diagnostic tool 50 comprises a connector or plug interface 51 connected to a device 52 for testing major or minor insulation on the cathode side of a high-voltage generator, according to an embodiment of the invention. Plug interface 51 serves to seal and connect the components of device 52 directly with a high-voltage generator 53 having a receptacle 56 configured to mate with plug interface 51. In one embodiment, a high-voltage cable 54 is positioned between the plug interface 51 and the receptacle 56. Plug interface 51 is shown to have three leads: a large filament lead 60; a common lead 62; and a small filament lead 64. Device 50 may be designed having leads 60-64 selected based on the type of x-ray tube being mimicked. Thus, when the testing device is connected to the high-voltage generator 53, application of high-voltage by the high-voltage generator 53 may allow testing the major insulation thereof, and application of a current to the large filament lead 60 may allow testing the minor insulation thereof.

As illustrated in FIG. 2, device 52 contains a circuit configuration comprising a resistor 68, a high-voltage resistor 70, and a high-voltage capacitor 72 configured to simulate or mimic the load of an x-ray tube. Resistor 68 provides electrical resistance to simulate or mimic the load of filament operation in an x-ray tube and typically has a resistance value that includes resistances ranging from 0.4 ohms to 1.3 ohms. Resistor 70 and capacitor 72 together mimic the load of the high-voltage between cathode and ground of a typical monopolar x-ray tube. Thus, the specific values of the resistors 68, 70, as well as the capacitance of capacitor 72, may be selected based on the tube being mimicked under its desired operating conditions (e.g., kV, mA, and filament current). Further, while small filament lead 64 is shown to be open in FIG. 2, small filament lead 64 may alternatively be connected to a circuit configuration similar to that shown with regard to large filament lead 60. Thus, diagnostic tool 50 can additionally be configured to test a load through small filament lead 64, thus testing the minor insulation associated with the small filament and the major insulation associated therewith. In this way, diagnostic tool 50 is capable of testing various load levels so as to mimic different types of x-ray tubes under different operating conditions (e.g., kV, mA, and filament current).

In an example where high-voltage instability is observed, a tool, such as tool 50, may be used to diagnose the source of the problem in place of an x-ray tube or dummy plug. Thus, when diagnostic tool 50 is connected to high-voltage generator 53 via plug interface 51, the diagnostic tool 50 mimics the full load characteristics of an x-ray tube, thereby simulating the x-ray tube under operation. When diagnostic tool 50 is connected and power from high-voltage generator 53 is applied to tool 50, the technician can observe whether or not high-voltage discharges (or "spits") occur, or whether other symptoms of high-voltage instability are present, as is understood within the art. If symptoms occur when the diagnostic tool 50 is connected directly to the high-voltage generator 53, the technician can ascertain that, for instance, high-voltage instability may be attributable to the high-voltage generator 53 and not a faulty x-ray tube or high-voltage cable. However, if minimal or no high-voltage discharges are observed when the diagnostic tool 50 is connected to high-voltage generator 53, the technician may deduce that the cause of high-voltage instability in the system lies in either the high-voltage cable or the x-ray tube itself. In such an instance, a test using a high-voltage cable to connect the diagnostic tool 50 to the high-voltage generator 53 can also be performed, where the technician is able to observe whether symptoms occur. Thus, in this instance, if significant discharges are observed, then the technician may further deduce that the problem may be caused by a faulty high-voltage cable. However, if minimal or no high-voltage discharges are observed in this scenario, then a faulty x-ray tube may be deduced to be the cause of the high-voltage instability in the system.

In this way, the diagnostic tool 50 enables a technician to deduce whether a failure is caused by the x-ray tube itself, by the high-voltage generator, or by the connection therebetween. If it is determined that the x-ray tube is not at the root of the failure, diagnostic tool 50 is further capable of pinpointing the source of high-voltage instability in the system, be it the high-voltage generator 53 or the high-voltage cable, thereby greatly improving the technician's understanding of the reasons behind the failure. Further, based on the resistances of resistors 68 and 70, the capacitance of capacitor 72, and the type of testing conducted (e.g., kV, mA, and filament current applied) the diagnostic tool 50 may be used as described above to test either the major insulation or the minor insulation of the system.

Referring now to FIG. 3, a diagnostic tool 80 according to another embodiment of the invention is shown. Diagnostic tool 80 includes a plug interface 81 and device 82. Plug interface 81 is shown to have three leads: a large filament lead 84; a common lead 86; and a small filament lead 88, similar to that which is shown in FIG. 2. Diagnostic tool 80 comprises two separate circuit configurations: a small load 87 configured to mimic a small filament, and a large load 89 configured to mimic a large filament, each of which are selectable by way of a switch 90. Corresponding resistors 92 and 94 provide filament resistance to switch between large and small filaments and to draw the desired current when their respective loads 87, 89 are selected via switch 90. Thus, when switch 90 is connected to the "small" load side 87, resistor 96 and capacitor 98 together mimic loading of the high-voltage anode/cathode of an x-ray tube, and the small filament is mimicked via the resistor 94. Conversely, when switch 90 is connected to the "large" load side 89, resistor 100 and capacitor 98 mimic loading of the high-voltage anode/cathode of an x-ray tube, and the large filament is mimicked via the resistor 92. Thus, through the use of switch 90, diagnostic tool 80 is capable of testing both the small and large filament circuits of a system (i.e., minor insulation), which may be done using variable load parameters (kV, mA, and A), as well as testing the major insulation of the system. As such, the diagnostic tool 80 can be used to test for high-voltage instability and deduce the source of instability for a plurality of mimicked scan techniques, and is thus capable of testing both major insulation and minor insulation.

Referring now to FIG. 4, yet another embodiment of the invention is shown. FIG. 4 illustrates a diagnostic tool 110 having four circuit configurations 112, 114, 116, and 118. The diagnostic tool further includes a common lead 122, a large filament lead 123, and a small filament lead 128. Switch 120 may select either line 111 or 113 to connect common lead 122 to circuit configurations 112, 114 representing, for example, "large" load circuit configurations or to circuit configurations 116, 118 representing, for example, "small" load circuit configurations. For example, FIG. 4 shows that switch 120 connects common lead 122 to the "small" load side circuit configuration 116 at pole 121 and via switch 124.

Further, circuit configurations 112, 114 are connected to switch 127 via contact points 1, 2, respectively, for coupling to large filament lead 123. Circuit configurations 116, 118 are likewise connected to switch 126 via contact points 3, 4, respectively, for coupling to small filament lead 128. Circuit configurations 112-118 are designed, like that described above with respect to circuit configurations 87, 89 of FIG. 3, such that each circuit configuration 112-118 represents a respective set of load parameters (kV, mA, and A) corresponding to desired x-ray tube and scan parameter characteristics.

Thus, as an example, with switch 120 at pole 121, and using switches 124 and 126, the diagnostic tool 110 can be used to choose loads for a desired scan technique using the small filament lead 128. In like fashion, switch 120 may be switched instead to pole 125, thus enabling selection of the large load circuits 112, 114 via switches 119 and 127. Furthermore, it can be easily understood that alternate configurations for coupling circuit configurations 112-118 to leads 122, 123, and 128 are possible and are deemed to be within the scope of embodiments of the invention. While four circuits 112-118 are illustrated, embodiments of the invention are not limited as such, and one skilled in the art will recognize that less or more circuit configurations than those illustrated may be implemented in a single diagnostic tool 110.

In providing these multiple load settings within one device, diagnostic tool 110 enables a technician to test a high-voltage system using a variety of different scan techniques and using a variety of large or small filament resistances, without the need for multiple diagnostic tool devices. Thus, a technician is capable of testing both major insulation and minor insulation in a system using multiple settings embodied in a single device and deducing the source of high-voltage instability in the manner described above.

When subjected to high load tests, diagnostic tools 50, 80, 110 of FIGS. 2-4 may generate heat that is desirable to be removed therefrom. Accordingly, FIG. 4 shows a heat pipe 129 or similar device thermally coupled to each circuit configuration 114, 118 for cooling the diagnostic tool 110. Heat pipes 129 are operable to dissipate heat from the circuits thermally coupled thereto and protect the components within diagnostic tool 110, and heat pipes 129 may be sunk to a cooling device (not shown) that is external to the diagnostic tool 110. While shown in FIG. 4, one skilled in the art will recognize that heat pipe 129 may be thermally coupled to any of the embodiments described herein. One skilled in the art will also recognize that other mechanisms, such as forced convection cooling using gases (such as air), or liquids (such as glycol, dielectric oil, or water, as examples) may be used to cool the diagnostic tool 110

FIGS. 2-4 above illustrate embodiments of the invention in relation to monopolar systems, wherein the high-voltage generator 53 has a single receptacle in which the diagnostic tool (or x-ray tube) is connected, and wherein the cathode is at potential while the anode is grounded. However, the embodiments illustrated in FIGS. 2-4 may be used for testing the cathode side of a bipolar device as well, if used in conjunction with a device configured to test the anode side. FIGS. 5 and 6 illustrate embodiments of the invention pertaining to a bipolar system, wherein a device may be included to mimic operation of the anode side of a system and diagnose a source of high-voltage instability in a bipolar system, for testing major insulation (FIG. 5) or minor insulation (FIG. 6).

Referring to FIG. 5, a testing device 130 according to an embodiment of the invention is shown for input into an anode receptacle 152 of the high-voltage generator 150 in a bipolar device, for testing major insulation thereof. The testing device 130 comprises a device 134 and a plug interface 132, wherein the plug interface 132 includes three leads 135, 136, and 138. As FIG. 5 shows, the leads 135, 136, and 138 are open, thus allowing high-voltage to be applied thereto in order to test the major insulation. Thus, in a bipolar system, testing device 130 may be used on an anode side of a high-voltage generator, in conjunction with the cathode side testing devices 50, 80, 110. As such, the major insulation on the anode side of a bipolar system may be tested and the source of high-voltage instability therein may be accordingly deduced.

FIG. 6 illustrates a testing device 140 usable on the anode receptacle 162 of high-voltage generator 150 for testing minor insulation thereof according to an embodiment of the invention. Testing device 140 includes a device 144 and plug interface 142, which is designed to be connected with anode receptacle 162 of high-voltage generator 150. Plug interface 142 has three leads 145, 146, and 148 that are connected to a stator configuration 165 and positioned in device 144 that acts to mimic the load condition of an anode of an x-ray tube for use in a bipolar system. While the configuration is shown in a "delta" configuration, the device is not meant to be limited as such, and one skilled in the art will recognize that other configurations, such as a "wye" configuration, are also within the scope of embodiments of the invention. When inserted into the anode receptacle 162 of the high-voltage generator 150, testing device 140 may be used to test the minor insulation of the anode side by applying voltage thereto and observing high-voltage instability therein.

Thus, when used in conjunction with the testing devices 50, 80, 110, both the major and minor insulation of the anode side of a bipolar system can be tested by using, respectively, device 130 of FIG. 5 and device 140 of FIG. 6. Sources of high-voltage instability in the system may accordingly be diagnosed.

Figure 7:
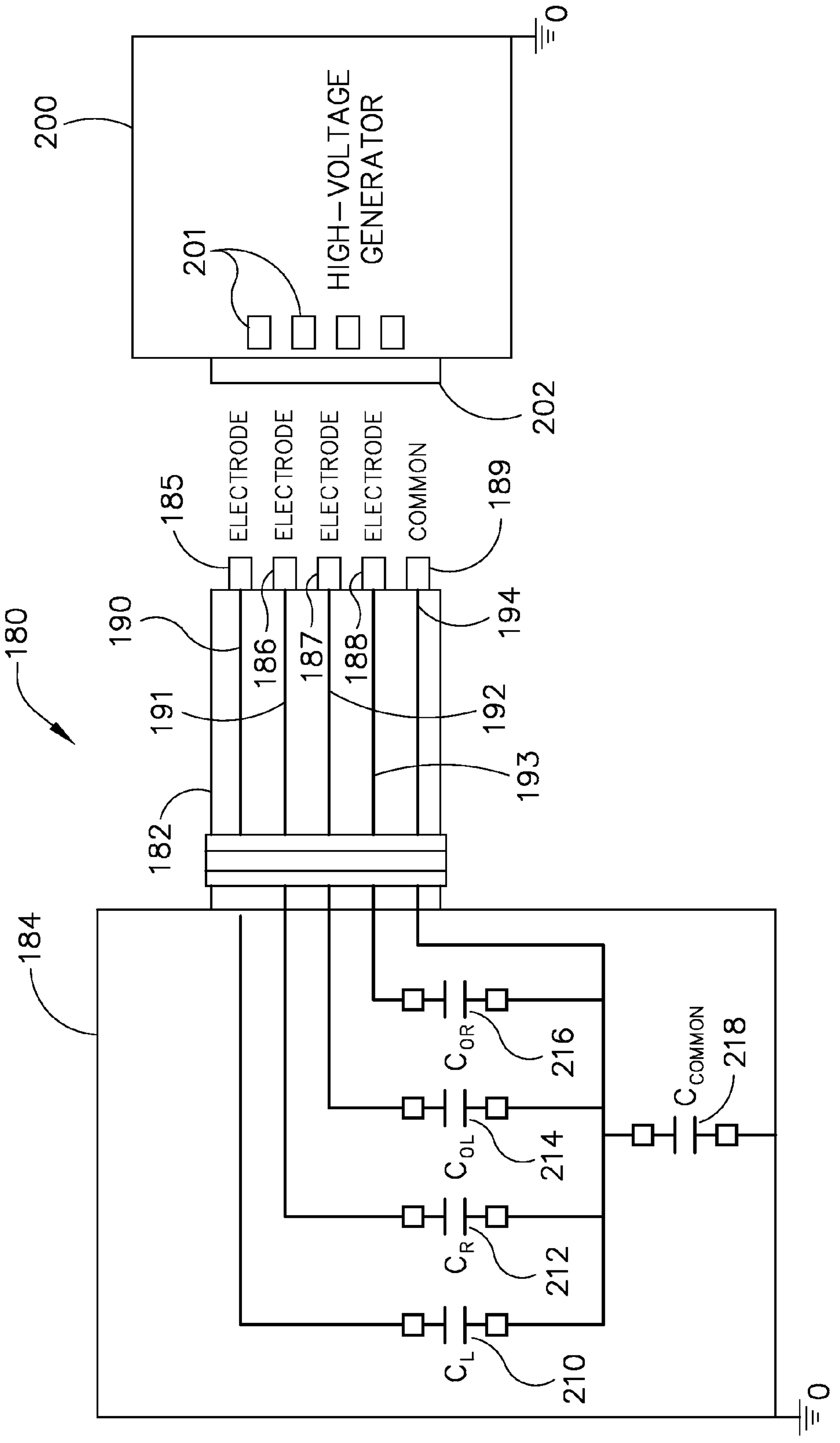
FIG. 7 is a schematic diagram of a testing device for testing electrode electrical supplies in a wobble-capable high-voltage generator according to another embodiment of the invention.

Referring to FIG. 7, yet another embodiment of the invention is shown. The diagnostic tool 180 is designed for troubleshooting high-voltage systems having bias supplies 201 positioned in the high-voltage generator 200. The bias supplies 201 provide bias voltages to either bias or focus tabs (not shown) within an x-ray tube in order to wobble the electron beam therein. In an alternate embodiment, bias supplies 201 are positioned as supplies that are separate from the high-voltage generator 200. In such an embodiment the high-voltage generator is configured to bring only the high voltage to the components, and bias voltages are provided via supplies that may be positioned external to the generator 200, and having minor insulation associated with each lead.

In such a system, the diagnostic tool 180 simulates or mimics the capacitive load of the bias or focus tabs within an x-ray tube. As FIG. 7 illustrates, diagnostic tool 180 comprises a device 184 and a plug interface 182. Plug interface 182 comprises five electrodes 185, 186, 187, 188, and 189 connectable to the bias supplies 201 of the high-voltage generator 200 via receptacle 202. Each electrode 185-189 corresponds, in this example, to length, focus, deflection left, deflection right, and common, respectively, of a wobble-capable x-ray tube which enable control of a wobbled spot therein. Each of electrodes 185-189 are attached to leads 190, 191, 192, 193, and 194, respectively, which are in turn connected to capacitors 210, 212, 214, 216, and 218 positioned in device 184. Capacitors 210-218 have a capacitive value typically between 100-500 pf. In this case, diagnostic tool 180 acts to mimic the capacitance characteristics of the bias electrodes an x-ray tube having wobble capability, and is operable to allow diagnosis of high-voltage instability attributable to generator bias supplies and/or tube electrodes. In the alternate embodiment where bias supplies 201 are positioned separate from the high-voltage generator 200, leads bringing electrical supply to the electrodes 185-189 may have their minor insulation tested in accordance with the techniques described herein.

One skilled in the art will recognize that embodiments of the invention may be combined herein. For instance, the embodiment illustrated in FIG. 7 is directed toward testing the capacitance characteristics of electrodes in a wobble-capable tube. Because the electrodes are on the cathode side of the wobble-capable tube, such capacitance testing functionality may be combined in a single device with other aspects of the invention having leads that connect to and mimic loading of the small and large filaments. Thus, as an example, in a monopolar device having focal spot wobble capability, the embodiment of FIG. 7 may be combined with one of the embodiments illustrated in FIGS. 2-4 to enable mimicking loading of the filaments and the electrodes and, in the manners described above, may be capable of mimicking operation of the cathode in order to test major or minor insulation, as well as the bias tabs and their supplies. Likewise, such a combined device may be further used in conjunction with one of the devices described with respect to FIGS. 5-6 in order to mimic, test, and diagnose loading and/or operation of a bipolar x-ray tube system having wobble capability. Furthermore, in combining embodiments of the invention, one skilled in the art will recognize that a high-voltage cable may be positioned between the test devices described herein and the high-voltage generator or tank to which they are attached. In such a fashion, a test configuration may include the effects of the high-voltage cable, thus allowing troubleshooting of the high-voltage cable to determine its effect on poor system performance.

Figure 8:
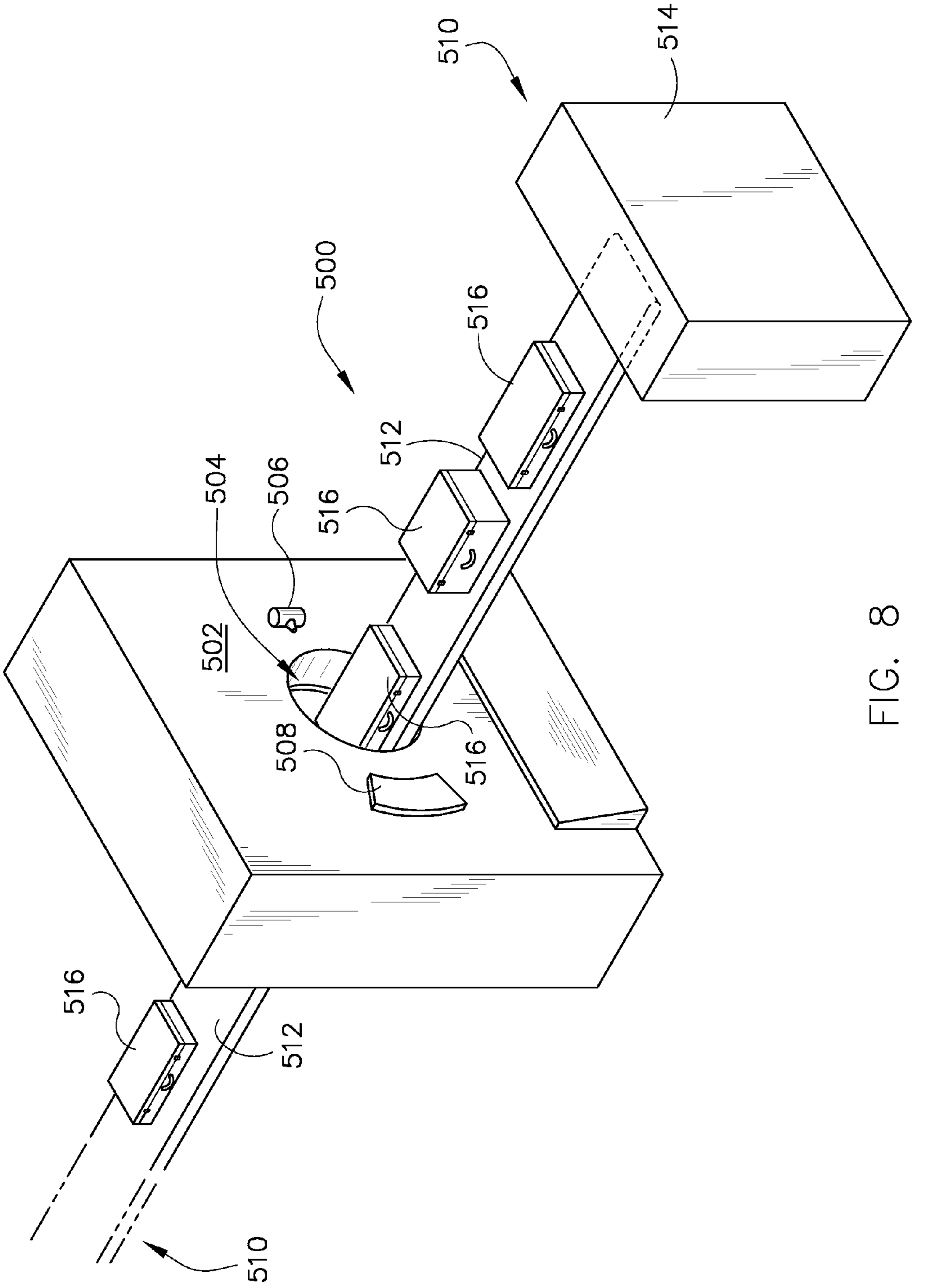
FIG. 8 is a pictorial view of an x-ray system for use with a non-invasive package inspection system.

FIG. 8 is a pictorial view of an x-ray imaging system 500 for use with a non-invasive package inspection system. The x-ray system 500 includes a gantry 502 having an opening 504 therein through which packages or pieces of baggage may pass. The gantry 502 houses a high frequency electromagnetic energy source, such as an x-ray tube 506, and a detector assembly 508. A conveyor system 510 is also provided and includes a conveyor belt 512 supported by structure 514 to automatically and continuously pass packages or baggage pieces 516 through opening 504 to be scanned. Objects 516 are fed through opening 504 by conveyor belt 512, imaging data is then acquired, and the conveyor belt 512 removes the packages 516 from opening 504 in a controlled and continuous manner. As a result, postal inspectors, baggage handlers, and other security personnel may non-invasively inspect the contents of packages 516 for explosives, knives, guns, contraband, etc. One skilled in the art will recognize that gantry 502 may be stationary or rotatable. In the case of a rotatable gantry 502, system 500 may be configured to operate as a CT system for baggage scanning or other industrial or medical applications.

According to one embodiment of the present invention, a diagnostic tool for an x-ray imaging system includes a first test device configured to simulate a first load condition of an x-ray tube, and a first connector electrically coupled to the first test device and configured to couple the first test device to a high-voltage generator in the x-ray imaging system.

In accordance with another embodiment of the invention, a method of manufacturing a diagnostic tool for an x-ray imaging system includes forming an x-ray tube mimicking device comprising one or more capacitors and resistors. The method further includes attaching a plug interface to the x-ray tube mimicking device, the plug interface configured to connect to a receptacle in the x-ray imaging system, and providing a plurality of leads connecting the plug interface to the one or more capacitors and resistors of the x-ray tube mimicking device.

Yet another embodiment of the present invention includes a method of diagnosing high-voltage problems for an x-ray imaging system that includes connecting a testing device to a high-voltage generator, the testing device configured to mimic a load condition of an x-ray tube, applying power to the testing device, and identifying a source of a high-voltage instability in the x-ray imaging system using the connected device.

The invention has been described in terms of the preferred embodiment, and it is recognized that equivalents, alternatives, and modifications, aside from those expressly stated, are possible and within the scope of the appending claims.

What is claimed is:

1. A diagnostic tool for an x-ray imaging system comprising:

a first test device configured to simulate a first load condition of an x-ray tube; and a first connector electrically coupled to the first test device and configured to couple the first test device to a high-voltage generator in the x-ray imaging system.

2. The diagnostic tool of claim 1 wherein the first load condition comprises normal operation of a cathode.

3. The diagnostic tool of claim 1 wherein the first test device and the first connector include a common line and at least one filament line that are each connectable to respective supplies in the high-voltage generator.

4. The diagnostic tool of claim 3 wherein the filament line is one of a small filament line and a large filament line.

5. The diagnostic tool of claim 3 wherein the first load condition is simulated by positioning a high-voltage resistor in parallel with a capacitor and positioning both between the common line and a ground of the first test device.

6. The diagnostic tool of claim 5 further comprising a heat pipe for cooling at least the high-voltage resistor.

7. The diagnostic tool of claim 3 wherein the first load condition is simulated by positioning a resistor between the common line and the at least one filament line.

8. The diagnostic tool of claim 3 further comprising at least one switch positioned between the common line and the at least one filament line and configured to select a second load condition different from the first load condition.

9. The diagnostic tool of claim 1 wherein the first load condition simulated includes one of kV, mA, and filament driving current.

10. The diagnostic tool of claim 1 further comprising:

a second test device that simulates a second load condition of an anode side of the x-ray tube; and a second connector that connects the second test device to an anode supply of the high-voltage generator in the x-ray imaging system.

11. The diagnostic tool of claim 10 further comprising a plurality of leads positioned in the second test device and the second connector, wherein the second load condition simulated includes having the plurality of leads that are open.

12. The diagnostic tool of claim 10, further comprising a plurality of leads positioned in the second test device and the second connector, wherein the second load condition simulated includes having the plurality of leads configured to mimic a stator of the x-ray tube.

13. The diagnostic tool of claim 1 further comprising a high-voltage cable coupled to the first connector and couplable to the high-voltage generator.

14. A method of manufacturing a diagnostic tool for an x-ray imaging system comprising:

forming an x-ray tube mimicking device comprising one or more capacitors and resistors;

attaching a plug interface to the x-ray tube mimicking device, the plug interface configured to connect to a receptacle in the x-ray imaging system; and providing a plurality of leads connecting the plug interface to the one or more capacitors and resistors of the x-ray tube mimicking device.

15. The method of claim 14 further comprising selecting the one or more capacitors and resistors based on a type of x-ray tube being mimicked.

16. The method of claim 14 further comprising coupling a switch between the plurality of leads and the one or more capacitors and resistors, wherein the switch is configured to select various load conditions therewith.

17. The method of claim 14 further comprising attaching a heat pipe to the one or more capacitors and resistors.

18. A method of diagnosing high-voltage problems for an x-ray imaging system comprising:

connecting a testing device to a high-voltage generator, the testing device configured to mimic a load condition of an x-ray tube;

applying power to the testing device; and identifying a source of a high-voltage instability in the x-ray imaging system using the connected device.

19. The method of claim 18 further comprising switching between the mimicked load condition and a second mimicked load condition via a switch positioned within the testing device.

20. The method of claim 18 wherein the step of connecting includes connecting to a cathode receptacle within the high-voltage generator.

21. The method of claim 19 wherein the step of connecting includes connecting the testing device to an anode receptacle within the high-voltage generator.

22. The method of claim 18 further comprising testing one of major and minor insulation of the x-ray imaging system.

* * * * *